United States Patent [19]

Witschard

[11] 4,423,188

[45] * Dec. 27, 1983

[54] VINYL HALIDE POLYMER BLENDS OF ENHANCED IMPACT RESISTANCE

[75] Inventor: Gilbert Witschard, Grand Island, N.Y.

[73] Assignee: Occidental Chemical Corporation, Niagara Falls, N.Y.

[*] Notice: The portion of the term of this patent subsequent to Mar. 9, 1999, has been disclaimed.

[21] Appl. No.: 355,425

[22] Filed: Mar. 8, 1982

Related U.S. Application Data

[63] Continuation-in-part of Ser. No. 172,929, Jul. 28, 1980, Pat. No. 4,319,002, which is a continuation of Ser. No. 881,949, Feb. 28, 1978, abandoned.

[51] Int. Cl.$^3$ ............... C08L 51/00; C08L 53/00
[52] U.S. Cl. .................................. 525/71; 525/76; 525/80; 525/84; 525/93; 525/96
[58] Field of Search .............. 525/71, 76, 93, 96, 525/80, 84, 172, 925

[56] References Cited

U.S. PATENT DOCUMENTS

| | | | |
|---|---|---|---|
| 3,444,267 | 5/1969 | Beer | 260/836 |
| 3,444,269 | 5/1969 | Beer | 260/836 |
| 3,489,821 | 1/1970 | Witt et al. | 260/876 |
| 3,489,822 | 1/1970 | Witt et al. | 260/876 |
| 3,657,382 | 4/1972 | Kopacki | 260/836 |
| 3,657,390 | 4/1972 | Tanaka et al. | 260/836 |
| 3,975,458 | 8/1976 | Severini et al. | 260/836 |
| 4,319,002 | 3/1982 | Witshard | 525/71 |

FOREIGN PATENT DOCUMENTS

| | | |
|---|---|---|
| 2011501 | 3/1970 | France . |
| 1054354 | 1/1967 | United Kingdom . |
| 1077080 | 7/1967 | United Kingdom . |
| 1097019 | 12/1967 | United Kingdom . |
| 1154917 | 6/1969 | United Kingdom . |
| 1158636 | 7/1969 | United Kingdom . |
| 1550478 | 8/1979 | United Kingdom . |

OTHER PUBLICATIONS

Chemical Abstracts, vol. 81, No. 22, 12/2/74, p. 43, Abstract No. 137155w.
"Patent Abstracts of Japan", vol. 4, No. 85, (C15) (567), 6/18/80, p. 99C15.
Van Kenten, K., "Plastica", vol. 25, No. 4, pp. 143-152, Apr. 1972.

*Primary Examiner*—J. Ziegler
*Attorney, Agent, or Firm*—James F. Tao; James F. Mudd

[57] ABSTRACT

A polymer blend capable of being molded to an impact resistant, substantially transparent or translucent article which comprises a vinyl halide homopolymer or copolymer, a conventional impact resistance enhancing polymer agent for polyvinyl halide wherein the monomer units consist essentially of methyl methacrylate, 1,3-butadiene and styrene residues and a thermoplastic block elastomer wherein the essential and predominant monomer units are the residue of a mono-alkenyl aromatic hydrocarbon and the residue of an alkadiene hydrocarbon. The thermoplastic elastomer is normally incompatible with the vinyl halide polymer or copolymer. The vinyl halide polymer or copolymer constitutes the major proportion of said blend and the block and methacrylate polymers together constitute a minor proportion of the composition. The weight ratio of block polymer to methacrylate polymer is about 1:5 to about 5:1.

30 Claims, No Drawings

VINYL HALIDE POLYMER BLENDS OF ENHANCED IMPACT RESISTANCE

CROSS REFERENCE TO RELATED APPLICATIONS

This application is a continuation-in-part of copending U.S. Application Ser. No. 172,929, filed July 28, 1980 now U.S. Pat. No. 4,319,002, which in turn is a continuation of U.S. Application Ser. No. 881,949 filed Feb. 28, 1978, now abandoned.

This invention relates to thermoplastic polymer blends capable of being molded into substantially transparent or transluscent articles having a high impact resistance. More particularly, it is concerned with moldable polyblends containing a major proportion of a vinyl halide polymer or copolymer wherein the component polymers are inter-compatible.

BACKGROUND OF THE INVENTION

Polyvinyl halide (inclusive of vinyl halide homopolymers as well as copolymers of vinyl halide with less than about fifty percent of an ethylenically unsaturated comonomer copolymerizable with the vinyl halide) is a widely used thermoplastic having a number of favorable technological properties. However polyvinyl halide, e.g. polyvinyl chloride, especially rigid polyvinyl halide, breaks on impact very easily at low temperature (i.e. at ambient temperature or lower). It is therefore generally necessary to improve its impact resistance by addition of an appropriate polymer additive or additives (conventionally termed "polyvinyl halide impact modifiers").

The selection of an appropriate impact modifier for polyvinyl halide is highly empirical since, in addition to imparting enhanced impact strength to the polyvinyl halide substrate, the modifier should fulfill additional requirements, namely:

1. small quantitites of the modifiers must suffice; (i.e. the modifier must be effective in imparting impact resistance when present in a minor proportion in the mixture of polyvinyl halide and impact modifier)
2. the good properties of the polyvinyl halide should not be adversely affected;
3. the modifiers must be incorporated into the polyvinyl halide easily;
4. the modifiers must be stable towards light and ageing if the polyvinyl halide is to be used in the open over a long period;
5. when the high impact polyvinyl halide is processed, its impact resistance must also be substantially constant when the processing conditions (e.g., temperature, time, shearing effects) vary;
6. light transmission (i.e. transluscency) and transparency must not be substantially impaired;
7. conventional additives and stabilizers must be usable;
8. the high impact modifiers must be physiologically acceptable.

A particularly serious defect in many polymers which might otherwise be thought to be suitable as impact modifiers for polyvinyl halide is incompatibility of the polymer additive with the polyvinyl halide. Such incompatible polymers when mixed with polyvinyl halide and subjected to elevated temperature processing conditions (as in molding) do not form stable polymer blends with the polyvinyl halide substrate, i.e. on fusion they form a polymer phase separate from the polyvinyl halide phase. The incompatible additive phase when present can impair the impact resistance as well as the light transmission and transparency of the polyvinyl halide composition. This incompatibility often manifests itself by formation, on molding of the composition, of a solid exudate on the surface of the composition which imparts an undesirable rough or lumpy handle to the composition.

Additionally, many potential polymer additives which might otherwise be though to be suitable as impact modifiers have a refractive index so different from that of polyvinyl halide (generally about 1.52–1.55), that, on blending with the polyvinyl halide, they impair substantially the translucency and transparency of the composition.

Among materials which have found acceptance as polyvinyl halide impact modifiers are the polymers consisting essentially of methyl methacrylate, 1,3-butadiene and styrene monomer units which are known generically as "MBS" polymers. Unfortunately these polymers, when prepared for use as polyvinyl halide impact modifiers, are relatively costly. This is so since the MBS polymers are generally prepared by a complex sequence of graft polymerization reactions wherein careful control of the reaction conditions is required if the MBS polymer product is to have the appropriate refractive index for blending with polyvinyl halide (i.e. a refractive index about the same as that of the polyvinyl halide).

Accordingly, it would be technologically desirable to replace a portion of the MBS polymer in an MBS-modified polyvinyl halide composition by a polymer which meets the requirements for impact modification and is also readily available at a refractive index about the same as that of polyvinyl halide.

A readily available class of polymers, namely the block thermoplastic elastomers of a hydrocarbon alkadiene of 4 to 10 carbon atoms and a mono-alkenyl-substituted aromatic compound of the benzene or naphthalene series containing up to 20 carbons (as typified by the block polymers of 1,3-butadiene or isoprene and styrene) is known to have a refractive index about that of the polyvinyl halides (as indicated by "Modern Plastics Encyclopedia 1974–1975", Vol. 51, No. 10A, October 1974, page 563, entry 35 at the fourth and seventh vertical columns). However, as shown in the Examples set forth below, these block polymers are found in general to be incompatible with polyvinyl halide or even with polyvinyl halide modified with small amounts of an MBS polymer additive, i.e. compositions of the polyvinyl halide, the MBS polymer and the block polymer wherein the ratio of the block polymer to the MBS polymer is greater than about 5:1.

The prior art (N. Platzer, Chemtech, October 1977, pages 634–641) discloses the use of the aforementioned block polymers as components for enhancing the impact resistance of high impact polystyrene and acrylonitrile-1,3-butadiene-styrene copolymers. Also it is known to employ these block polymers as impact modifiers in polyethylene and polypropylene. However, the prior art does not disclose polyblend compositions of polyvinyl halide or MBS polymer-modified polyvinyl halide with the aforementioned block polymers as impact modifier components.

SUMMARY OF THE INVENTION

The invention is directed to a thermoplastic composition which is capable of being molded to a substantially transparent or translucent article and which comprises a blend of a vinyl halide polymer wherein a major proportion of the monomer units are vinyl halide monomer residues; a polyvinyl halide impact resistance enhancing polymer agent wherein the major proportion of the monomer units are methyl methacrylate, 1,3-butadiene and styrene residues and which has about the same refractive index as said vinyl halide polymer, and a block thermoplastic elastomer wherein the major proportion of the monomer units are residues of a monoalkenyl-substituted aromatic compound of the benzene or naphthalene series of 8 to 20 carbon atoms and a conjugated alkadiene hydrocarbon of 4 to 10 carbon atoms. The block polymer is normally incompatible with said vinyl halide polymer. The vinyl halide polymer is present in a major proportion in the blend, and the methacrylate polymer modifier and the block polymer taken together is present in a minor proportion in the blend with the weight ratio of said block polymer to said methacrylate polymer being about 1:5 to about 5:1.

The present compositions, in molding under conventional conditions of temperature and pressure, are capable of providing molded products substantially transparent or at least substantially transluscent having an impact resistance generally greater than those of the corresponding composition of polyvinyl halide modified with MBS polymer alone and of the corresponding composition (i.e. generally an incompatible mixture) of the polyvinyl halide modified with the block polymer alone. In other words, the combined presence of the MBS-polymer and the block polymer component with the polyvinyl halide according to the invention synergistically enhances the impact resistance of the polyvinyl halide without substantially impairing the transparency or transluscency of the vinyl halide polymer. The components of the polyblend of the invention are intercompatible even on molding and do not separate as individual solid phases. Accordingly, the formation of solid exudates (of deleterious unattractive rough handle) on the surface of the present compositions does not occur on molding. In general, the combination of MBS-polymer and the block polymer as an impact modifier for polyvinyl halide according to the invention meets or surpasses all of the requirements generally desired in a polyvinyl halide-impact modifier as discussed above.

DETAILED DESCRIPTION OF THE INVENTION AND THE PREFERRED EMBODIMENTS THEREOF

The desired proporation of block polymer and methacrylate polymer (i.e. MBS polymer) in the present composition and the ratio of the block polymer to the methacrylate polymer to provide optimum impact-resistance will vary somewhat depending upon the particular methacrylate and block polymer employed. The combination of methacrylate polymer constituent and the block polymer constituent is generally present in a minor proportion in the blend of the invention, that is a proportion of about one to about fifty weight percent, preferably of about 5 to about 20 weight percent, and especially of about 8 to about 15 weight percent. Similarly the vinyl halide polymer is present in a major proportion, that is constitutes about 50 weight percent to about 99 weight percent of the blend, and preferably is present at about 80 to about 95 weight percent concentration, especially at about 85 to about 92 weight percent concentration.

The weight ratio of block polymer to methacrylate polymer is about 1:5 to about 5:1, and preferably is about 1:4 to about 4:1.

The Polyvinyl Halide Component

The vinyl halide polymer employed as a component in the present composition can be made by any of the known polymerization processes used for preparation of these polymers e.g., vapor phase, emulsion, suspension, solution or bulk liquid phase polymerization. Conveniently vinyl halide polymers prepared by the bulk liquid phase polymerization mode are employed.

An especially desirable bulk-liquid phase-polymerized polyvinyl halide for use in the invention is obtained by free radical addition polymerization in two reaction stages, i.e. a first stage employing high speed, high shear agitation until conversion of monomer or monomers to polymer is about 3 to 15% and a second stage employing low speed, low shear agitation until polymerization is complete. This technique is disclosed in U.S. Pat. No. 3,522,227 and British Pat. No. 1,047,489, the pertinent disclosure of these patents being incorporated herein by reference.

The polyvinyl halide resin contemplated for use in the invention is a rigid resin, i.e., a resin containing less than about 10 percent plasticizer or none at all. Typically, the resin is a readily available commercial resin which is processed at a temperature on the order of about 350° F. or even higher. While vinyl chloride is the preferred vinyl halide monomer reactant used in preparing the vinyl halide polymers of the invention, other suitable vinyl halide monomers useful in the invention are the alpha-halo-substituted ethylenically unsaturated compounds which, like vinyl chloride, are capable of entering into an addition polymerization reaction, for example, vinyl fluoride, vinyl bromide, vinyl iodide, vinylidene fluoride, vinylidene chloride, vinylidene bromide, vinylidene iodide and the like. Vinyl halide polymers derived from polymerization of two, three or more different vinyl halide monomers can also be used. It is to be understood that the polyvinyl halide resin, as contemplated for use in this invention, can be a modified resin, e.g., a copolymer resin of vinyl halide with a minor amount i.e. less than 50 weight percent of the total monomer mixture, of a comonomer, e.g. of vinyl acetate, or preferably the copolymer resin prepared by copolymerizing vinyl halide monomer with from about 1 to about 30 weight percent of a comonomer copolymerizable with the vinyl halide. Thus, while the polyvinyl halide component of the invention is preferably comprised totally of vinyl chloride homopolymer, or other vinyl halide homopolymer, the present invention is also intended to include copolymers thereof as previously described. Suitable ethylenically unsaturated comonomer materials which can be used to form the base vinyl halide copolymers (i.e. vinyl halide bipolymers, terpolymers, tetrapolymers and higher copolymers, interpolymers, and the like), by the reaction with vinyl halide include the following monolefinic compounds: ethylene, propylene, butene-1, 3-methylbutene-1, 4-methylpentene-1, pentene-1, 3,3-dimethylbutene-1, 4,4-dimethylbutene-1, octene-1, decene-1, styrene and its nuclear alphaalkyl or aryl substituted derivatives, e.g., o-, m- or p-methyl, ethyl, propyl or butyl styrene; alphamethyl, ethyl, propyl or butyl styrene; phenyl styrene, and halogenated styrenes such as alphachlorostyrene; monolefinically unsaturated esters including vinyl esters, e.g., vinyl acetate, vinyl propionate, vinyl butyrate, vinyl stearate, vinyl laurate, vinyl benzoate, vinyl caprate, vinyl hexanoate, vinyl-p-chlorobenzoates, alkyl methacrylates, e.g., methyl, ethyl, propyl and butyl methacrylate; octyl methacrylate, lauryl methacrylate, stearyl methacrylate, alkyl crotonates, e.g., octyl; alkyl acrylates, e.g., methyl, ethyl, propyl, butyl, 2-ethyl hexyl, stearyl, n-hexyl, n-octyl, hydroxyether and tertiary butylamino acrylates, 2-ethoxy ethyl acrylate, 2-methoxy ethyl acrylate, isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alpha-chloroacetate, vinyl alpha-chloropropionate and vinyl alpha-bromopropionate; allyl and methallyl esters, e.g., allyl chloride, allyl cyanide; allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate, and ethyl alpha-chloroacrylate, methyl alpha-bromoacrylate, ethyl alpha-bromoacrylate, methyl alpha-fluoroacrylate, ethyl alpha-fluoroacrylate, methyl alpha-iodoacrylate and ethyl alpha-iodoacrylate; alkyl alpha-cyanoacrylates, e.g., methyl alpha-cyanoacrylate and ethyl alpha-cyanoacrylate; itaconates, e.g., monomethyl itaconate, monoethyl itaconate, diethyl itaconate, alcohol (C-3 to C-8) itaconates; maleates, e.g., monomethyl maleate, monoethyl maleate, dimethyl maleate, diethyl maleate, alcohol (C-3 to C-8) maleates; and fumarates, e.g., monomethyl fumarate, monoethyl fumarate, dimethyl fumarate, diethyl fumarate, alcohol (C-3 to C-8) fumarates, and diethyl glutaconate; monoolefinically unsaturated organic nitriles including, for example, fumaronitrile, acrylonitrile, methacrylonitrile, ethacrylonitrile, 1,1-dicyanopropene-1, 3-octenenitrile, crotonitrile and oleonitrile; monoolefinically unsaturated carboxylic acids including, for example, acrylic acid, methacrylic acid, crotonic acid, 3-butenoic acid, cinnamic acid, maleic, fumaric and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethylhexyl ether, vinyl 2-chloroethyl ether, vinyl cetyl ether, and the like; and vinyl sulfides, e.g., vinyl beta-chloroethyl sulfide, vinyl beta-ethoxyethyl sulfide and the like can also be included as can diolefinically unsaturated hydrocarbons containing two olefinic groups in conjugated relation and the halogen derivatives thereof, e.g. butadiene-1,3; 2-methylbutadiene-1,3; 2,3-dimentyl-butadiene-1,3; 2-chlorobutadiene-1,3; 2,3-dichlorobutadiene-1,3; and 2-bromobutadiene-1,3 and the like.

When the vinyl halide polymer component of the invention is a copolymer, said copolymer can also be a graft copolymer of a vinyl halide (or of vinyl halide and comonomer copolymerizable therewith) and a polyolefin rubber i.e. elastomer, which is characterized by being soluble, partially soluble, or dispersible at ambient or room temperature and pressure in vinyl halide monomer. The latter known vinyl halide graft copolymers are obtained by polymerizing a mixture of vinyl halide monomer with one or more ethylenically unsaturated comonomers of the type described above (or more conveniently, a vinyl halide monomer alone) in the presence of the olefin trunk polymer reactant. The polyolefin elastomer or rubber is a homopolymer, bipolymer, terpolymer, tetrapolymer or higher copolymer of olefinic monomers. The olefin polymers can also contain the residue of a polyene, e.g. a non-conjugated, diene as a monomer unit.

The aforementioned olefin homopolymers can be obtained by polymerization of a suitable monomer such as ethene, propene, i.e. propylene, butene-1, isobutene, octene, or 5-methylhexene-1.

Suitable comonomers for use in preparing the polyolefins are those utilized to prepare the olefin homopolymers as listed above, such as propene or butene-1 with ethene and the like. Suitable termonomers are those utilized to prepare homopolymers and copolymers as disclosed above such as propene, ethene and the like as well as a polyene. Especially suitable polyene-derived ter- and higher co-polymers can be prepared from olefin monomer mixtures containing up to 15 percent, preferably up to about 6 percent by weight, of the polyene, e.g. dicyclopentadiene, cyclooctadiene and other dienes with linear or cyclic chains. The polyolefin used may also be a halogenated polyolefin, e.g. a chlorinated, brominated or fluorinated polyolefin.

The polyolefins used are characterized by being soluble, partially soluble or dispersible at ambient temperature and pressure in vinyl chloride monomer, and in having, typically, monomeric units of 2 to 8 carbon atoms. The weight average molecular weight of the olefin polymers, copolymers, terpolymers, and tetrapolymers can vary from about 50,000 to about 1,000,000 and higher. Preferred as polyolefin rubbers for use in preparing vinyl halide graft polymers for use in the invention are ethene-propene polyolefin elastomers and ethene-propene-diene polyolefin elastomers.

The vinyl halide-graft copolymers of the polyolefin elastomers are prepared by polymerizing the vinyl halide in the presence of about 0.05 to about 20% preferably about 1 to about 20%, based on the weight of vinyl halide monomer of the above-described polyolefin rubber. Preparation of such vinyl halide-polyolefin graft copolymer according to emulsion and suspension polymerization techniques is described in G. Natta et al., U.S. Pat. No. 3,812,204, the disclosure of which is incorporated herein by reference. Preparation of such vinyl halide-polyolefin graft copolymer by vapor phase and solution polymerization techniques are described, respectively, in J. Dumoulin et al., U.S. Pat. No. 3,789,083 and F. M. Rugg et al., U.S. Pat. No. 2,947,719, the disclosure of which is incorporated herein by reference. Conveniently the preparation of the vinyl halide-polyolefin graft copolymers useful as the polyvinyl halide component of the compositions of the invention is effected by a bulk liquid phase polymerization technique as described by A. Takahashi, U.S. Pat. No. 4,071,582, copending U.S. application Ser. No. 746,046, filed Nov. 30, 1976 now U.S. Pat. No. 4,163,033 and by L. E. Walker, U.S. Pat. Nos. 4,007,235 and 4,067,928, the disclosure of which Takahashi and Walker patents is also incorporated herein by reference.

It is to be understood that the above-described vinyl halidepolyolefin graft copolymers possess an impact resistance substantially greater than the impact resistance of conventional (i.e. ungrafted) vinyl halide homopolymers and copolymers. Nevertheless, the impact resistance properties of such graft copolymers is generally further improved by blending with the present methacrylate polymer and block polymer in accordance with the invention.

The Methyl Methacrylate-1,3-Butadiene-Styrene Polymer (MBS Polymer) Component The methyl methacrylate-1,3-butadiene-styrene polymers employed as components of the compositions of the invention constitute a readily available class of polymers (generally proprietary polymers) which are manufactured to have a refractive index about that of polyvinyl halide and which are widely employed as impact modifiers for polyvinyl halide resins. The MBS polymers as manufactured for use as polyvinyl halide impact modification agents are generally graft polymers prepared by polymerizing methyl methacrylate (and optionally in minor proportion to the methacrylate monomer ethylenically unsaturated comonomers copolymerizable therewith such as acrylonitrile or styrene) in the presence of a polybutadiene or a polybutadiene-styrene trunk polymer rubber, as described in L. I. Nass Ed. "Encyclopedia of PVC", M Dekker, Inc., Vol. 2, 1977, page 613, Section 2(a), the disclosure of which is incorporated by reference. It is well understood that a wide variety of grafting conditions and choice of comonomers can be employed in the preparation of the MBS-impact modifiers. Typical graft polymerization sequences and/or comonomers for use with the methacrylate monomer in preparation of the MBS polymer modifiers are disclosed in the following U.S. Pat. Nos: K. Saito et al., 3,670,052; K. Saito et al., 3,651,177; K. Saito et al., 3,287,443; S. S. Feuer, 2,943,074; L. E. Daly, 2,018,267; L. A. Beer, 3,444,269; A. C. Condo, 3,445,416; T. Tanaka et al., 3,652,483; S. Yonezu et al., 3,652,727; T. Tanaka et al., 3,657,390; S. Koyanagi et al., 3,717,688; Y. Amagi et al., 3,775,514; T. J. G. Lonning, 3,780,134; T. Tanaka et al., 3,842,144; H. Kumabe et al., 3,907,928; F. E. Love, 3,922,320; N. Murayama et al., 4,021,509; F. Ide et al., 4,041,106 and S. Koyanagi et al., Germ. Offenlegungsschrift No. 2,064,297 issued July 1, the disclosures of which are incorporated herein by reference.

Proprietary MBS polymers manufactured as impact modification additives for vinyl halide polymers include Acryloid KM229, KM607-N and KM611 of Rohm and Haas Co. (described in R. P. Petrich, Polymer Eng. and Sci., July 1973, Vol. 13, No. 4, pages 248–258 and in J. T. Lutz, Jr., Adv. in Chem. Ser. No. 134, 1974, pages 61–72, the disclosures of which are incorporated herein by reference) as well as Kane Ace B-12 and B-22 manufactured by Kanegafuchi Chemical Industry Co. The latter proprietary MBS polymer, i.e. Kane Ace B-22, which provides an especially good result when employed as the methacrylate polymer component of the invention, is prepared in accordance with the technology of the above-mentioned U.S. Pat. Nos. 3,387,443, 3,651,177 and 3,670,052 of K. Saito et al.

The Block Polymer Component

The block polymer component of the compositions of the invention is a thermoplastic block elastomer wherein the major proportion of the monomer units are derived from (1) a mono-alkenyl-substituted aromatic compound of the benzene or naphthalene series containing 8 to 20 carbons and (2) a conjugated hydrocarbon alkadiene of 4 to 10 carbon atoms.

The monoalkenyl aromatic compound of the benzene or naphthalene series employed as a monomer in preparing the block polymer constituent of the present composition can be, for example, styrene; o-, m- or p-methyl styrene; o-, m-, or p-n-butyl-styrene; m-isopropyl-styrene; p-t. butyl-styrene; p-octyl-styrene; 2,3-dimethyl styrene; 3-ethyl styrene; alpha methyl-styrene; p-n-dodecyl-styrene; p-methoxy-styrene; p-n-butoxy-styrene; p-isopropoxy-styrene; p-n-dodecoxy styrene; m-n-octylstyrene; 1-vinyl naphthalene; 2-vinylnaphthalene; 1-methyl-2-vinyl-naphthalene; 1-vinyl-2-n-octyl naphthalene; 1-vinyl-2-isopropyl-naphthalene; 1-vinyl-2-methoxynaphthalene or mixtures thereof. Preferably the monoalkenyl-substituted aromatic compound is a hydrocarbon (i.e. consists exclusively of hydrogen and carbon atoms) and the alkenyl group is the vinyl group, $CH_2=CH-$. Preferably also the monoalkenyl-substituted aromatic compound is a compound of the benzene series, especially an alkenyl-substituted compound of the benzene series containing up to 12 carbon atoms. Block polymers prepared using styrene as the monoalkenyl-substituted aromatic monomer are especially preferred.

The conjugated hydrocarbon alkadiene monomer used to prepare the block polymer constituent of the present composition can be, for example, 1,3-butadiene; isoprene; 2,3-dimethyl-butadiene; 2-n-butyl-1,3-butadiene; 1,3-cyclohexadiene; 2-n-hexyl-1,3-butadiene; 1,3-pentadiene; 1,3-hexadiene; 1,3-decadiene; 2-isopropyl-1,3-butadiene; 2-t-butyl-1,3-butadiene; 1,3-cyclodecadiene; 2,4-octadiene; or mixtures of the foregoing cyclic or open chain alkadiene hydrocarbons. Preferably the alkadiene monomer employed in the block polymer constituent of the present composition is an open chain alkadiene and especially is 1,3-butadiene or isoprene.

While it is preferred that all of the monomer units of the present block polymer constituent consists of residues of the foregoing alkadiene and mono-alkenyl-substituted aromatic compounds, it is understood that, if desired, minor proportions of the residues of other ethylenically unsaturated compounds copolymerizable with the alkadiene and the alkenyl-substituted aromatic monomer can be present also as comonomer units, for example residues of vinyl pyridine, acrylonitrile, lower alkyl esters of acrylic acid (wherein the term lower alkyl indicates a straight or branched alkyl group of 1 to 6 carbon atoms, e.g. methyl) methacrylonitrile and vinyl carboxylates, e.g. vinyl acetate.

The weight ratio of the mono-alkenyl-substituted aromatic compound residue to the alkadiene residue is not especially critical in the block polymer and can vary over a wide range. However, because of their ready availability, the block polymers preferably employed in the invention have a weight ratio of mono-alkenyl-substituted aromatic compound residue to alkadiene residue in the range of about 1:1 to about 1:10, and especially of about 1:1.5 to about 1:6.

The block polymers of the invention are generally prepared by a sequential polymerization of the monomer reactants employing an anionic addition polymerization. The reaction is generally carried out in the presence of a catalyst for anionic polymerization such as an organo lithium catalyst such as n-butyl lithium. (Under the latter reaction conditions a block copolymer is formed substantially to the exclusion of formation of a conventional copolymer, i.e. a random network or graft copolymer, of the aforementioned monomers). The polymerization reaction is effected in an inert atmosphere under substantially anhydrous conditions. The polymerization can be carried out in the absence of presence of an inert reaction mixture diluent or solvent such as an ether devoid of functional groups containing active hydrogen, e.g. tetrahydrofuran, or advantageously, an aromatic hydrocarbon such as benzene, toluene, xylene and the like.

The preparation of the aforementioned block polymers is more particularly described in L. M. Potter, U.S. Pat. No. 3,149,182; R. N. Cooper, U.S. Pat. No. 3,030,346; R. P. Zelinski, U.S. Pat. No. 3,287,333; K. J. Silberberg, U.S. Pat. No. 3,380,863, at Col. 3, lines 5-28 and Col. 5, lines 10-40; R. A. Hinton, U.S. Pat. No. 3,452,119; J. K. Craver and R. W. Tess Ed. "Applied Polymer Science", Organic Coating and Plastics Chemistry Div. of American Chem. Soc., 1975, pages 394-429, M. Morton Ed. "Rubber Technology", Van Nostrand-Rheinhold Co., Second Edition, 1973, pages 515-533 and D. C. Allport et al. Ed. "Block Copolymers", Wiley (Halstead Press), 1973, pages 81-87, the disclosure of which is incorporated herein.

The aforementioned block polymers can be linear block polymers composed of two homopolymeric segments or blocks (termed a diblock polymer) or three (termed a triblock polymer) or more homopolymeric segments. The block polymers of the invention can be graded or tapered block polymers wherein, for example, one polymer segment or block of the polymer begins with a particular monomer unit and gradually incorporates another monomer unit until at the end, said block is totally composed of the second monomer units. The block polymers of the invention can also be of star-like or radial polymeric structure wherein 2, 3, 4 or more homopolymeric blocks radiate from another, central homopolymeric block. The latter radial block copolymers can be prepared by charging a small or minor amount of a polyfunctional-alkenyl aromatic compound, i.e. a dialkenyl-substituted aromatic hydrocarbon of the benzene or naphthalene series of 10 to 20 carbon atoms, e.g. 1,4-divinyl benzene or 1,4-divinyl naphthalene, to the partially reacted reaction mass of the aforementioned polymerization (which has already sufficiently reacted to form a diblock polymer).

Block polymers of an alkenyl-substituted aromatic hydrocarbon monomer (e.g. styrene) and alkadiene (e.g. 1,3-butadiene or isoprene) containing tapered blocks are more particularly described at page 395 of the aforementioned Craver and Tess textbook reference and at pages 83-84 of the aforementioned Allport et al. textbook reference. Similarly, preparation of block polymers having a star or radial configuration is described by the Craver and Tess textbook reference at pages 395 (Table II), 421, and 422 (Table VI); by the aforementioned N. Platzer, Chemtech reference, especially page 637, Column 1, lines 33-35 and FIG. 2; and by the anonymous article entitled "New Rubber is Backed by Stars", Chemical Week, June 11, 1975, page 35. The disclosures of the latter two references are also incorporated herein by reference.

It is emphasized that the aforementioned FIG. 2 of the Platzer reference graphically indicates the substantial distinctions between the present block copolymers and corresponding conventional copolymers (including random, network and graft copolymers).

Block copolymers of styrene and 1,3-butadiene or of styrene and isoprene are readily available as proprietary polymers manufactured under the designation "Kraton" by Shell Chemical Co. and under the designation "Solprene" by Phillips Petroleum Co. As indicated by the fourth and sixth horizontal lines of the aforementioned Table VI of page 422 of the Craver and Tess textbook reference, the Kraton copolymers are linear block polymers of styrene and 1,3-butadiene or isoprene whereas the Solprene copolymers are radial block polymers or are block polymers containing a tapered block wherein the monomer units are derived from styrene and 1,3-butadiene.

The compositions of the invention may also contain various functional additives, which additives are conventional in the preparation of rigid vinyl halide compositions suitable for molding. Typically these additives include external and internal lubricants, thermal and/or light stabilizers, and processing aids for the vinyl halide resin component. In general, the amount of each type of additive employed in the present compositions is about 0.01 to about 5 weight percent, preferably about 0.1 to about 3 weight percent based on the weight of the total resin composition.

The lubricants contemplated by the invention include natural and synthetic waxes such as carnauba wax; montan wax and derivatives thereof; paraffin wax; low molecular weight polyethylene; oxidized polyethylene based on low density or high density polyethylene; long chain fatty alcohols such as acetyl and stearyl alcohols; high molecular weight fatty acids containing from 6 to 20 C atoms and their metal salts and esters, such as, for example, aluminum, barium, calcium, lead, lithium, zinc, magnesium and cadmium stearates, cetyl palmitate, glyceral monostearate, stearic acid, myristic acid, n-butyl stearate, ethyl palmitate and glyceryl tristearate; further, amides derived from fatty acids, such as stearic acid, e.g. N,N'-ethylene-bis-stearamide. All of the above listed materials are commercially available (generally as proprietary products) specifically for use as lubricants in polyvinyl halide compositions. The presence of one or more lubricants in vinyl halide polymer compositions is desirable in order to prevent sticking of the compound during processing, e.g. molding, and to decrease internal and external friction in the processing of the product.

Individual lubricants may predominate in contributing either an external lubrication effect or an internal lubrication effect to the vinyl halide polymer in which they are incorporated. For this reason, it is generally advantageous to employ a mixture of a lubricant or lubricants which contribute predominantly an external lubrication effect with a lubricant or lubricants which contribute predominantly an internal lubricant effect. Typical of lubricants which have predominantly an external lubricating effect on polyvinyl halide are stearic acid and its salts with calcium, lead, cadmium and barium, myristic acid, paraffin wax, low molecular weight polyethylene and ethyl palmitate. Typical lubricants, which have predominantly an internal lubricating effect on the vinyl halide polymers in which they are incorporated, include glyceryl esters of fatty acids of 12 to 18 carbon atoms such as glyceryl monostearate, long chain fatty alcohols such as stearyl alcohol and cetyl alcohol and the esters with long chain aliphatic carboxylic acids such as cetyl palmitate. A more particular description of lubricants for use in vinyl halide polymers is set forth in L. I. Nass Ed., op. cit. pages 648-652 and G. Mathews, "Vinyl and Allied Polymers", CRC Press, Vol. 2, 1972, pages 117-119, 141, the disclosure of these references being incorporated herein by reference.

Stabilizers suitable for use in making the vinyl halide polymer composition in accordance with the invention include all of the materials known to stabilize polyvinyl halide against degradation action of heat and/or light.

They include all classes of known stabilizers, both organic and inorganic such as metal salts of mineral acids, salts of organic carboxylic acids, e.g. carboxylic acids of 6 to 18 carbon atoms, organo-tin compounds, epoxides, amine compounds and organic phosphites.

Inorganic stabilizers suitable for use as stabilizers in the improved method of the present invention include salts of mineral acids such as carbonates, for example sodium carbonate and basic lead carbonate; sulfates, such as tribasic lead sulfate monohydrate and tetrabasic lead sulfate; silicates, such as the silicates of calcium, barium and strontium; phosphates, such as trisodium phosphate; phosphites, such as sodium and potassium phosphite.

Typical salts of organic carboxylic acids suitable for use as stabilizers in the present invention include stearates, laurates, caproates, ricinoleates and undecylates of metals such as lead, cadmium, manganese, cerium, lithium, strontium, sodium, calcium, tin, barium, magnesium, especially dibasic lead stearate. Further included are the metal salts of aromatic acids such as phthalates, naphthenates, and salicylates, such as basic lead phthalate. Some of the above-mentioned stabilizers, as, for example, the abovedescribed metal salts of organic carboxylic acids of 6 to 18 carbon atoms, especially the stearates and laurates of lead, cadmium, manganese, lithium, strontium, sodium, calcium, tin, barium, and magnesium, also function as lubricants as described herein below so that such metal carboxylate salts when employed in amounts according to the invention will also serve as the lubricant.

Suitable organo-tin stabilizers include mono-, di- and tri-organo-tin esters of mercapto-substituted carboxylic acids, more particularly described by structural formula definition in Reiter et al., U.S. Pat. No. 3,862,066 (at the passage running from Col. 6, line 40 to Col. 7, line 2) and applicant's U.S. Pat. No. 3,970,612, the disclosures whereof being incorporated herein by reference.

Specific examples of suitable organo-tin stabilizers include di-n-butyl tin S,S'-bis(iso-octyl mercaptoacetate), di-n-octyl-tin S,S'-bis(iso-octyl mercaptoacetate), di-n-butyl tin bis-(monomethylmaleate), di-n-butyl tin bis-(isooctyl thioglycolate), di-n-butyl tin bis-mercaptopropanoate, di-n-butyl tin bis-(2-ethylhexanoate), di-n-butyl tin diacetate, di-n-butyl tin stearate, tri-n-octyl tin laurate, n-butyl tin tris-(isobutyl thioglycolate), and mixtures thereof.

Suitable epoxide stabilizers include the glycidyl ethers, including those of allyl alcohol and its polymerizates as well as those of diethylene glycol, glycerine, naphthol, resorcinol, tetraphenylol methane an diphenyl propane (Bis-phenol A). Also included are the reaction products of Bisphenol A glycidyl monoether with epichlorohydrin; the glycidyl alcohol esters, such as glycidyl oleate, and, importantly, unsaturated epoxy esters, especially those based on natural glycerides or the esters of natural or artificial acids and synthetic alcohols. Within this latter class are included natural epoxidized oils such as epoxidized soy bean, linseed and cotton seed oil; epoxidized tallow and lard; the products of esterification of an epoxidized fatty acid and a synthetic alcohol, and completely synthetic esters such as epoxyalkylsuccinic acids, Exemplary specific epoxy stabilizers include methyl epoxystearate, butyric ester of epoxidized soya-bean oil, epoxystearate of monobutyl ether of diethylene glycol, cyclohexyl epoxy stearate, 2-ethyl-hexyl epoxystearate, methoxyethyl epoxystearate, phenyl epoxystearate, hexyl-epoxystearate, and others. Also suitable are the metal salts of epoxidized fatty acids, especially the zinc, cadmium, strontium, barium or lead salts or epoxy stearic acid and acids extracted from cotton seed oil and epoxidized soy-bean oil. Further epoxy-type stabilizers include the epoxy derivatives obtained by multistep procedures starting with cyclohexane such as, for example, 9-10-epoxystearate of 3,4-epoxycyclohexylmethane, and iso-octyl-9-10 epoxystearate.

Suitable amine stabilizers include diphenyl amine, thiourea, aryl thiourea, N,N'-bis-(o-hydroxyphenyl)-urea, N-phenyl-N'-(p-dimethylaminophenyl)thiourea, and condensation products of substituted amines and diacids.

Suitable organic phosphite stabilizers include triphenyl, trioctyl, tricresyl mono- or dialkyl or aryl phosphites and mixed salts thereof, such as cadmium alkyl-aryl phosphite, cadmium alkyl phosphite and zinc alkyl-aryl phosphite.

A detailed description of stabilizers and stabilizer combinations suitable for use in polyvinyl halide, including those herein discussed as suitable for use in the present vinyl halide polymer compositions, is found in F. Chevassus and R. de Broutelles, "The Stabilization of Polycinyl Chloride", St. Martin's Press, New York, 1963, pages 101–168, the disclosure of which is incorporated herein by reference.

Conveniently an organo tin compound of the structural type described above is employed as stabilizer.

The organic processing aid contemplated for incorporation into the polyvinyl halide composition of the invention is typically a polymer of a lower alkyl ester of acrylic acid or methacrylic acid, e.g. methyl methacrylate. Copolymers of a lower alkyl acrylate and a lower alkyl methacrylate, (wherein lower alkyl signifies 1 to 6 carbon atoms) such as the copolymer containing about 13% ethyl acrylate and 87% methyl methacrylate, manufactured under the designation Acryloid K-120 ND (by Rohm and Haas Corp.) can be used as processing aid additives also. Other typical processing aids well-known in the art include acrylonitrile-styrene copolymers and methyl acrylate-butadiene-styrene-based terpolymers and acrylonitrile-butadiene-styrene-based terpolymers. The chemical structure of organic processing aids suitable for use as additives in polyvinyl halide (many of which are available commercially only as proprietary materials) is more particularly discussed in L. Mascia, "The role of Additives in Plastics", J. Wiley and Sons, 1974, page 36; P. F. Briuns Ed., "Polyblends and Composites", Interscience Publishers, 1970, page 166; C. F. Ryan, SPE Journal 24 89 (1968); R. J. Grochowski et al., U.S. Pat. No. 3,833,686, and E. C. Szamborski et al., Kunstoffe 65 29 (1975), the disclosure of the foregoing references being incorporated herein by reference.

Additional classes of additives known for use in polyvinyl halide resins which can be added optionally to the compositions of the invention in addition to the aforementioned stabilizers, lubricants and processing aids (in proportions similar to those of the latter additives) include pigments, dyes and fillers as described in L. R. Brecker, *Plastics Engineering,* March 1976, "Additives, 76", pages 3–4, the disclosure of which is incorporated herein by reference.

As mentioned above the compositions of the invention are rigid polyvinyl halide compositions which contain no more than about 10 weight percent of a plasticizer for polyvinyl halide and preferably are free of said plasticizing additive. Typical suitable plasticizer additives (which are generally organic ocmpounds) conventionally employed in polyvinyl halide compositions include, for example, the esters of aliphatic alcohols of medium chain length, e.g. of 7 to 11 carbon atoms, with phenyl dicarboxylic acids, e.g. di-n-octyl phthalate and di-isononyl phthalate as well as organic phosphate esters such as cresyl-diphenyl-phosphate and octyl diphenyl-phosphate. The chemical structure and technology of plasticizers conventionally employed in polyvinyl halide compositions is more particularly discussed in L. R. Brecker, op. cit. page 5, the disclosure of which is incorporated herein by reference.

The compositions of the invention can be prepared by milling and mixing techniques conventional for preparing conventional impact-modified vinyl halide polymer polyblends, e.g. conventional MBS-polymer modified polyvinyl halide. Generally the component polymers (and, if desired, the above-described optional additives) are added as a particulate solid mixture to a roll mill or a Banbury type mixer and milled at an elevated temperature conventional for processing rigid vinyl halide polymer compositions. The resultant polymer blend obtained as product from the milling and mixing operation is molded to articles of particular desired shapes at elevated temperature and pressure conditions which are conventional in molding rigid polyvinyl halide compositions. Desirably, a compression molding technique is employed to prepare the aforementioned articles which can be in various shapes including bars, plates, rings, rods, as well as sheets and films.

The following examples further illustrate the various aspects of the invention but are not intended to limit it. Various modifications can be made in the invention without departing from the spirit and scope thereof. Where not otherwise specified in this specification and claims, temperatures are given in degrees centigrade, and all parts ratios and percentages are by weight.

EXAMPLE 1

A particulate solid mixture of 100 parts of a vinyl chloride homopolymer which is prepared by bulk liquid phase polymerization and has a Notched Izod impact resistance (ASTM Test D-256) in the range of about 0.4 to less than 1 ft.-lbs/in., 6.5 parts of a proprietary methyl methacrylate-1,3-butadiene-styrene polymer conventionally employed for impact resistance-enhancement of vinyl halide polymers (manufactured by Kanegafuchi Chem. Ltd. under the designation Kane Ace B-22), 6.5 parts of a proprietary styrene-1,3-butadiene radial block polymer containing about 40% styrene and about 60% 1,3-butadiene (manufactured by Phillips Petroleum Co. under the designation Solprene 414-P), 2.85 parts of an acrylic polymer processing aid conventionally employed in processing vinyl halide resins (manufactured by Rohm and Haas Corp. under the designation Acryloid K-120-ND), 1.14 parts of a proprietary short chain paraffin wax conventionally employed as an internal lubricant in molding vinyl halide polymers (manufactured by Cincinnati-Milacron Co. under the designation Advawax 140), 0.23 parts of proprietary wax which is a derivative long chain (28–32 carbon atoms) montan-wax acid which contains a diester of a dihydric alcohol and which is conventionally employed as an external lubricant (having some internal lubricant function) in molding vinyl halide polymers (manufactured by American Hoechst Corp. under the designation Wax E) and 1.8 parts of a proprietary methyl-tin mercaptide conventionally employed as a heat stabilizer in vinyl halide polymers (manufactured by Cincinnati-Milacron Co. under the designation TM-181) is added to the rolls of an Amil Mill operating under the following conditions:
Front Roll Temperature 355°–360° F.
Back Roll Temperature 330°–335° F.
Roll Speed 48 ft./min.
The fusion time of the mixture in the mill is about 10–15 seconds. The mixture remains on the mill rolls for about 5 minutes with the appearance of the bands of the mixture on the rolls being satisfactory. The mixture is delivered from the mill as a sheet which is allowed to cool to about ambient temperature (about 20°).

The resultant polyblend is compression molded as bars 6 inches in length, 6 inches in width and ⅛ inch in thickness employing a large Carver Press which operates under the following sequence of temperature and pressure conditions: 3-minutes at 350° F., 1000 psi; 2 minutes at 350° F., 30,000 to 32,000 psi; and 2 minutes at ambient temperature 30,000 to 32,000 psi.

The resultant molded bar samples are cut to provide bar samples of ½ inch width which are notched and tested for Notched Izod Impact resistance at ambient temperature and −20° F. substantially in accord with ASTM Test D256. The results of this test and appearance of the molded bar articles are presented in Table I below.

EXAMPLES 2-9

In a series of Examples 2-9, the procedure of Example 1 is repeated substantially as described except that the amounts charged of the methacrylate polymer component and the block polymer component are varied or, in some instances, either the methacrylate polymer or the block polymer is omitted. The results of these examples are summarized in Table I below.

TABLE I

| EXAMPLE | % METHACRYLATE POLYMER (on weight of total resin composition) | % BLOCK POLYMER (on weight of total resin composition) | NOTCHED IZOD IMPACT RESISTANCE VALUES (ft.lbs/in) | | APPEARANCE OF MOLDED ARTICLE |
|---|---|---|---|---|---|
| | | | Ambient Temp. | −20° F. | |
| 1 | 5.5 | 5.5 | 18.8 | 0.87 | Transparent, substantially colorless with slight, attractive blue cast; no surface exudate |
| 2 | 4.0 | 7.0 | 19.1 | 0.59 | Substantially transparent (very slight haze), substantially colorless with slight attractive blue cast; no surface exudate |
| 3 | 2.5 | 8.5 | 13.3 | 0.66 | Substantially transparent (slight haze), substantially colorless with slight, attractive blue cast; no surface exudate |
| 4 (Control) | 1.0 | 10.0 | 4.5 | 0.67 | Transparency impaired by haze; substantially colorless with bluish cast; surface exudate |
| 5 | 10.9 | 0 | 9.4 | 0.54 | Transparent; substantially colorless |

TABLE I-continued

| EXAMPLE | % METHACRYLATE POLYMER (on weight of total resin composition) | % BLOCK POLYMER (on weight of total resin composition) | NOTCHED IZOD IMPACT RESISTANCE VALUES (ft.lbs/in) Ambient Temp. | −20° F. | APPEARANCE OF MOLDED ARTICLE |
|---|---|---|---|---|---|
| 6 (Control) | 5.8 | 0 | 2.3 | 0.46 | Transparent; substantially colorless |
| 7 (Control) | 0 | 5.8 | 1.5 | 0.64 | Slight haze; substantially colorless with bluish haze |
| 8 (Control) | 0 | 8.6 | 2.4 | 0.69 | Transparency impaired by haze, substantial bluish case, surface exudate |
| 9 (Control) | 0 | 10.9 | 1.6 | 0.77 | Transparency impaired by haze (greater than in Example 5); substantial bluish cast; surface exudate |

NOTE: The above-described surface exudate in the molded products of Control Examples 4, 8 and 9 occurs in the molding of the compositions and appears as minute solid lumps on the surface of the product imparting a rough handle to the product surface.

Comparison of the ambient temperature impact resistance results of Examples 1–3 (which illustrate the compositions of the invention and which contain block polymer to methacrylate polymer in a ratio of about 1:1 to 4:1 with the ratio of styrene to butadiene in the block polymer being about 2:3) with the corresponding impact resistance results of Control Examples 5–6 (which omit the block polymer component), on the one hand, and of Control Examples 7–9 (which omit the methacrylate polymer), on the other hand, indicate that the impact resistance of the compositions of the invention is synergistically enhanced by the combined presence, according to the invention, of both the block polymer and the methacrylate polymer in a vinyl halide resin blend.

Control Examples 8–9 further illustrate that the block polymer additive by itself in a vinyl halide resin is incompatible with the vinyl halide polymer as especially indicated by the formation of a transparency impairing surface exudate on the products of these Examples. Control Example 4 illustrates a vinyl halide polymer containing both a methacrylate polymer and block polymer wherein, however, the ratio of the latter two additives is outside the ratio of the invention. In the latter Example the ambient temperature impact resistance of the product is not synergistically enhanced by the joint presence in vinyl halide polymer of both the methacrylate polymer and the block polymer. Moreover, the polymer components of the Example 4 product are incompatible with each other as indicated by the surface solid exudate in the Example 4 product.

EXAMPLES 10–16

A series of illustrative and control Examples 10–16 similar to those described above in Examples 1–9 is performed employing the procedure of Example 1, substantially as described, except that the block polymer employed is a proprietary radial styrene-1,3-butadiene block polymer containing about 30% styrene and about 70% (manufactured by Phillips Petroleum Co. under the designation Solprene 411-P). The results of these Examples are presented in Table II below.

TABLE II

| EXAMPLE | % METHACRYLATE POLYMER (on weight of total resin composition) | % BLOCK POLYMER (on weight of total resin composition) | NOTCHED IZOD IMPACT RESISTANCE VALUES (ft. lbs/in) Ambient Temp. | −20° F. | APPEARANCE OF MOLDED ARTICLE |
|---|---|---|---|---|---|
| 10 | 5.5 | 5.5 | 9.5 | 0.85 | Transparent; substantially colorless; no surface exudate |
| 11 | 4.0 | 7.0 | 15.0 | 0.69 | Substantially transparent (with very slight haze); substantially colorless; no surface exudate |
| 12 | 2.5 | 8.5 | 3.3 | 0.60 | Substantially transparent (with slight haze) substantially colorless; no surface exudate |
| 13 (Control) | 1.0 | 10.0 | 2.2 | 0.62 | Transparency impaired by substantial haze; substantially colorless; surface has solid exudate indicating incomaptibility of component polymers |
| 14 (Control) | 0 | 5.8 | 1.3 | 0.61 | |
| 15 (Control) | 0 | 8.6 | 1.6 | 0.64 | |
| 16 (Control) | 0 | 10.9 | 1.3 | 0.66 | |

Compositions of the invention in Table II, i.e. the products of Examples 10, 11 and 12 (which have about 1:1 to about 4:1 ratio of block polymer to methacrylate polymer with the ratio of styrene to butadiene in the block polymer being about 1:2.3) are seen to have an enhanced ambient temperature impact resistance compared to that obtainable (at corresponding concentrations) in polyvinyl halide-methacrylate polymer compositions devoid of block polymer (of the type illustrated in Control Examples 5 and 6 above), polyvinyl halide-block polymer compositions devoid of methacrylate polymer (the products of Control Examples 14–16) or polyvinyl halide compositions containing both methacrylate polymer and block polymer but at a ratio of the latter two polymeric additives outside that of the invention (the product of Control Example 13).

The polyvinyl halide compositions of Table II which contain block polymer but no methacrylate polymer (the products of Control Examples 14–16) and the polyvinyl halide composition of Table II which contains methacrylate polymer and block polymer at a ratio other than that of the invention (the product of Control Example 13) are seen to have inferior optical properties compared to the products of the invention illustrated in Examples 10, 11 and 12. Moreover the polymer component of the products of Control Examples 13–16 are incompatible with each other as indicated by the presence of substantial solid exudate on the surface of the products.

EXAMPLES 17–22

In Examples 17, 19 and 21 the results of which are set forth in Table III below the procedure of Example 1 is repeated substantially as described above employing several different proprietary block polymers of a mono-alkenyl substituted aromatic compound and an alkadiene according to the invention (the particular block polymer employed being identified in the footnotes of the Table). Examples 18, 20 and 22 (the results of which are also presented in Table III) are Control Examples corresponding, respectively, to aforementioned Examples 17, 19 and 21 wherein the methacrylate polymer component is omitted.

Control Examples 5 and 6) and with those of the corresponding vinyl halide compositions containing the block polymer but no methacrylate polymer (i.e. the product of the appropriate Control Example in Examples 18, 20 and 22) indicates that the ambient temperature impact resistance of the products of Examples 17, 19 and 21 is enhanced synergistically.

The invention has been described in the above specification and illustrated by reference to specific embodiments in the illustrative examples. However, it is to be understood that these embodiments are not intended to limit the invention since changes and modifications in the specific details disclosed hereinabove can be made without departing from the scope or spirit of the invention.

What is claimed is:

1. In a vinyl halide polymer composition which is capable of being molded to an impact resistant, substantially transparent to translucent article and which comprises a blend of a vinyl halide polymer wherein the major proportion of the monomer units are vinyl halide monomer residues and a polymeric impact modifier for polyvinyl halide wherein the monomer units consist essentially of methyl methacrylate, 1,3-butadiene and styrene residues and which has about the same refractive index as said vinyl halide polymer, the improvement wherein the blend also comprises a block thermoplastic elastomer wherein the major proportion of the monomer units are residues of a mono-alkenyl-substituted aromatic compound of a benzene or naphthalene series of 8 to 20 atoms and a conjugated alkadiene hydrocarbon of 4 to 10 carbon atoms, said block elastomer being normally incompatible with said vinyl halide polymer, said vinyl halide polymer being present in a proportion of about 50 to about 99 weight percent in said blend, and said polymeric impact modifier and said block elastomer together being present in a proportion of about one to about 50 weight percent in said blend with the weight ratio of said block elastomer to said polymeric impact modifier being about 5:1 to about 1:5.

2. The composition of claim 1 wherein the alkenyl aromatic compound is a hydrocarbon of the benzene

TABLE III

| EXAMPLE | % METHACRYLATE POLYMER (on weight of total resin composition) | % BLOCK POLYMER (on weight of total resin composition) | NOTCHED IZOD IMPACT RESISTANCE VALUES (ft.lbs/in) | | APPEARANCE OF MOLDED ARTICLE |
|---|---|---|---|---|---|
| | | | Ambient Temp. | −20° F. | |
| 17 (Note 1) | 5.5 | 5.5 | 18.2 | 0.83 | Translucent, substantially colorless; no surface exudate |
| 18 Control (Note 1) | 0 | 10.9 | 2.6 | 0.92 | Opaque, substantially colorless; surface has solid exudate |
| 19 (Note 2) | 5.5 | 5.5 | 16.2 | 0.72 | Substantially transparent (with slight haze); substantially colorless; no surface exudate |
| 20 Control (Note 2) | 0 | 10.9 | 1.8 | 0.73 | Translucent (not transparent) substantially colorless; surface has solid exudate |
| 21 (Note 3) | 5.5 | 5.5 | 16.3 | 0.83 | Substantially transparent (with slight haze); substantially colorless; no surface exudate |
| 22 Control (Note 3) | 0 | 10.9 | 3.0 | 0.92 | Translucent (not transparent); substantially colorless; surface has solid exudate |

NOTES:
1. The block polymer component is a proprietary triblock polymer of styrene and isoprene in a ratio of about 1:6, i.e. 14% styrene, 86% isoprene, manufactured by Shell Chemical Co. under the designation Kraton 1107.
2. The block polymer component is a proprietary triblock polymer of styrene and 1,3-butadiene in a ratio of about 1:3, i.e. 25% styrene, 75% 1,3-butadiene manufactured by Shell Chemical Co. under the designation Kraton 1101.
3. The block polymer component is a proprietary diblock polymer of styrene and 1,3-butadiene in a ratio of about 1:3, i.e. 25% styrene, 75% 1,3-butadiene, manufactured by Phillips Petroleum Co. under the designation Solprene 1205.

The products illustrative of the invention in Table III, i.e. the products of Examples 17, 19 and 21, wherein the ratio of block polymer to methacrylate polymer is about 1:1, have enhanced optical properties (i.e. transparency or transluscency) compared to the products of the corresponding Control Examples 18, 20 and 22 wherein the methacrylate polymer is omitted. The latter Control Example products also have a solid exudate in their surface which is substantially absent in the products of Examples 17, 19, and 21. These results further substantiate the incompatibility of the block polymer of the invention with vinyl halide polymer when the methacrylate polymer is omitted.

Comparison of the ambient temperature impact resistance results of the products of Examples 17, 19 and 21 with those of the corresponding vinyl halide polymer compositions containing the methacrylate polymer but no block polymer (i.e. the products of above-discussed series and the weight ratio of the block elastomer to the polymeric impact modifier is about 4:1 to about 1:4.

3. The composition of claim 2 wherein the units of the block elastomer are styrene and 1,3-butadiene or isoprene and the proportion of the polymeric impact modifier and the block elastomer in the composition is in the range of about 5 to 20 weight percent based on the weight of the blend.

4. The composition of claim 3 wherein the vinyl halide polymer is a homopolymer of vinyl chloride and the proportion of the polymeric impact modifier and styrene block elastomer in the composition is about 8 to about 15 weight percent based on the weight of the blend.

5. The composition of claim 4 wherein the vinyl chloride polymer is a bulk-polymerized polymer of vinyl chloride.

6. The composition of claim 5 wherein the block elastomer is a styrene-1,3-butadiene block polymer.

7. The composition of claim 6 wherein the weight ratio of the styrene to the 1,3-butadiene in the block elastomer is in the range of from about 1:1.5 to about 1:3.

8. The composition of claim 7 wherein the block elastomer is a diblock polymer containing styrene and 1,3-butadiene monomer residues in the weight ratio of about 1:3 and the weight ratio of the block polymer to the polymeric impact modifier is about 1:1.

9. The composition of claim 7 wherein the block elastomer is a triblock polymer containing styrene and 1,3-butadiene monomer residues in a weight ratio of about 1:3 and the weight ratio of the block polymer to the polymeric impact modifier is about 1:1.

10. The composition of claim 7 wherein the block elastomer is a radial block elastomer containing styrene and 1,3-butadiene monomer residues in the weight ratio of about 1:2.3 and the weight ratio of the block elastomer to the polymeric impact modifier is in the range of about 1:1 to about 4:1.

11. The composition of claim 7 wherein the block elastomer is a radial block elastomer containing styrene and 1,3-butadiene monomer residues in a ratio of about 2:3 and the weight ratio of block polymer to the polymeric impact modifier is about 1:1 to about 4:1.

12. The composition of claim 5 wherein the block elastomer is a styrene-isoprene block elastomer.

13. The composition of claim 12 wherein the block elastomer is a triblock elastomer containing styrene and isoprene monomer residues in a weight ratio of about 1:6 and the weight ratio of the block elastomer to the polymeric impact modifier is about 1:1.

14. An impact resistant, substantially transparent or translucent molded article formed from the composition of claim 1.

15. A vinyl halide polymer composition which is capable of being molded to an impact resistant, substantially transparent or transluscent article which comprises a blend of a vinyl halide polymer wherein the major proportion of the monomer units are vinyl halide monomer residues; a polymeric impact modifier for polyvinyl halide wherein the monomer units consist essentially of methyl methacrylate, 1,3-butadiene and styrene residues and which has about the same refractive index as said vinyl halide polymer; and a block thermoplastic elastomer wherein the major proportion of the monomer units are residues of a monovinyl-aromatic hydrocarbon compound of the benzene or naphthalene series of 8 to 20 carbon atoms and a conjugated alkadiene hydrocarbon of 4 to 10 carbon atoms, the proportion of said vinyl-aromatic hydrocarbon residues to said alkadiene residues being in the range of from about 1:1 to about 1:10, said block elastomer being normally incompatible with said vinyl halide polymer, said vinyl halide polymer being present in a proportion of about 50 to about 99 weight percent in said blend, and said polymeric impact modifier and said block elastomer together being present in a proportion of about one to about 50 weight percent in said blend with the weight ratio of said block elastomer to said polymeric impact modifier being about 5:1 to about 1:5.

16. In a vinyl halide polymer composition which is capable of being molded to an impact resistant, substantially transparent or translucent article and which comprises a blend of a vinyl halide polymer wherein the major proportion of the monomer units are vinyl halide monomer residues and a polymeric impact modifier of polyvinyl halide wherein the monomer units consist essentially of methyl methacrylate, 1,3-butadiene and styrene residues and which has about the same refractive index as said vinyl halide polymer, the improvement wherein the blend also comprises a block thermoplastic elastomer wherein the major proportion of the monomer units are residues of a mono-alkenyl-substituted aromatic compound of a benzene or naphthalene series of 8 to 20 atoms and a conjugated alkadiene hydrocarbon of 4 to 10 carbon atoms, said block elastomer being normally incompatible with said vinyl halide polymer, said vinyl halide polymer being present in a proportion of about 50 weight percent in said blend, and said polymeric impact modifier and said block elastomer together being present in a proportion of about 50 weight percent in said blend with the weight ratio of said block elastomer to said polymeric impact modifier being about 5:1 to about 1:5.

17. The composition of claim 16 wherein the alkenyl aromatic compound is a hydrocarbon of the benzene series and the weight ratio of the block elastomer to the polymeric impact modifier is about 4:1 to about 1:4.

18. A composition of claim 17 wherein the units of the block elastomer are styrene and 1,3-butadiene or isoprene.

19. The composition of claim 18 wherein the vinyl halide polymer is a homopolymer of vinyl chloride.

20. The composition of claim 19 wherein the vinyl chloride polymer is a bulk-polymerized polymer of vinyl chloride.

21. The composition of claim 20 wherein the block elastomer is a styrene-1,3-butadiene block polymer.

22. The composition of claim 21 wherein the weight ratio of the styrene to the 1,3-butadiene in the block elastomer is in the range of from about 1:1.5 to about 1:3.

23. The composition of claim 22 wherein the block elastomer is a diblock polymer containing styrene and 1,3-butadiene monomer residues in the weight ratio of about 1:3 and the weight ratio of the block polymer to the polymeric impact modifier is about 1:1.

24. The composition of claim 22 wherein the block elastomer is a triblock polymer containing styrene and 1,3-butadiene monomer residues in a weight ratio of about 1:3 and the weight ratio of the block polymer to the polymeric impact modifier is about 1:1.

25. The composition of claim 22 wherein the block elastomer is a radial block elastomer containing styrene and 1,3-butadiene monomer residues in the weight ratio of about 1:2.3 and the weight ratio of the block elastomer to the polymeric impact modifier is in the range of about 1:1 to about 4:1.

26. The composition of claim 22 wherein the block elastomer is a radial block elastomer containing styrene and 1,3-butadiene monomer residues in a ratio of about 2:3 and the weight ratio of block polymer to the polymeric impact modifier is about 1:1 to about 4:1.

27. The composition of claim 20 wherein the block elastomer is a styrene-isoprene block elastomer.

28. The composition of claim 27 wherein the block elastomer is a triblock elastomer containing styrene and isoprene monomer residues in a weight ratio of about 1:6 and the weight ratio of the block elastomer to the polymeric impact modifier is about 1:1.

29. An impact resistant, substantially transparent or translucent molded article formed from the composition of claim 16.

30. A vinyl halide polymer composition which is capable of being molded to an impact resistant, substantially transparent or translucent article which comprises a blend of a vinyl halide polymer wherein the major proportion of the monomer units are vinyl halide monomer residues: a polymeric impact modifier for polyvinyl halide wherein the monomer units consist essentially of methyl methacrylate, 1,3-butadiene and styrene residues and which has about the same refractive index as said vinyl halide polymer; and a block thermoplastic elastomer wherein the major proportion of the monomer units are residues of a monovinyl-aromatic hydrocarbon compound of the benzene or naphthalene series of 8 to 20 carbon atoms and a conjugated alkadiene hydrocarbon of 4 to 10 carbon atoms, the proportion of said vinyl-aromatic hydrocarbon residues to said alkadiene residues being in the range of from about 1:1 to about 1:10, said block elastomer being normally incompatible with said vinyl halide polymer, said vinyl halide polymer being present in a proportion of about 50 weight percent in said blend, and said polymeric impact modifier and said block elastomer together being present in a proportion of about 50 weight percent in said blend with the weight ratio of said block elastomer to said polymeric impact modifier being about 5:1 to about 1:5.

* * * * *